(12) United States Patent
Amano et al.

(10) Patent No.: US 7,066,047 B2
(45) Date of Patent: Jun. 27, 2006

(54) REARWARD DISPLACEMENT PREVENTION MECHANISM FOR VEHICLE CONTROL PEDAL

(75) Inventors: Takeshi Amano, Aichi (JP); Toshiyasu Shida, Okazaki (JP)

(73) Assignees: Mitsuishi Jidosha Kogyo Kabushiki Kaisha, Tokyo (JP); Mitsubishi Jidosha Engineering Kabushiki Kaisha, Kawasaki (JP)

( * ) Notice: Subject to any disclaimer, the term of this patent is extended or adjusted under 35 U.S.C. 154(b) by 43 days.

(21) Appl. No.: 10/163,336

(22) Filed: Jun. 7, 2002

(65) Prior Publication Data

US 2003/0000334 A1  Jan. 2, 2003

(30) Foreign Application Priority Data

Jun. 8, 2001 (JP) .............................. 2001-173422

(51) Int. Cl.
G05G 1/14 (2006.01)
B60K 28/14 (2006.01)

(52) U.S. Cl. .................... 74/512; 74/560; 280/784; 180/274; 180/275

(58) Field of Classification Search ............ 74/512, 74/513, 560, 478; 180/271, 274, 281; 280/784
See application file for complete search history.

(56) References Cited

U.S. PATENT DOCUMENTS

| 5,120,106 A | * | 6/1992 | Sakurai et al. ......... 296/193.02 |
| 5,778,732 A | * | 7/1998 | Patzelt et al. ................ 74/512 |
| 6,006,626 A | * | 12/1999 | Notake et al. ............... 74/512 |
| 6,041,674 A | * | 3/2000 | Kato ........................... 74/512 |
| 6,070,488 A | * | 6/2000 | Yabusaki et al. ............ 74/512 |
| 6,142,036 A | * | 11/2000 | Mizuma et al. .............. 74/512 |
| 6,209,416 B1 | * | 4/2001 | Tiemann et al. ............. 74/512 |
| 6,336,376 B1 | * | 1/2002 | Lee ............................ 74/512 |

FOREIGN PATENT DOCUMENTS

JP        10-278760 A    10/1998

* cited by examiner

*Primary Examiner*—Chong H. Kim
(74) *Attorney, Agent, or Firm*—Birch, Stewart, Kolasch & Birch, LLP

(57) ABSTRACT

There is provided a rearward displacement prevention mechanism for a control pedal, which is constructed such that a front end of a pedal bracket supporting a control pedal such that the control pedal is capable of pivoting is connected to a vehicle compartment side of a dash panel that separates an engine room and a vehicle compartment from each other, a rear end of the pedal bracket is mounted on a cowl top panel disposed at the upper side of the dash panel via a releasing mechanism, and a regulating device is provided in the vehicle compartment to be opposed to the cowl top panel. With this arrangement, the pedal bracket can be surely released by operation of the releasing mechanism even in the case where the cowl top panel and the dash panel are moved rearward at the same time.

3 Claims, 5 Drawing Sheets

REARWARD DISPLACEMENT PREVENTION MECHANISM FOR VEHICLE CONTROL PEDAL

BACKGROUND OF THE INVENTION

This non-provisional application claims priority under 35 U.S.C. § 119(a) on Patent Application No. 2001-173422 filed in Japan on Jun. 8, 2001, which is herein incorporated by reference.

FIELD OF THE INVENTION

This invention relates to a rearward displacement prevention mechanism for a vehicle control pedal that moves toward the inner side of a vehicle compartment when impact load is applied to the front of the vehicle.

DESCRIPTION OF THE RELATED ART

There have been proposed a variety of rearward displacement prevention mechanisms for a vehicle control pedal in the case where the vehicle control pedal might cause injury to a passenger if it moves rearward to the inner side of a vehicle compartment when impact load is applied to the front of a vehicle.

For example, Japanese Laid-Open Patent Publication (Kokai) No. 10-278460 has proposed a mechanism that prevents rearward movement of a vehicle control pedal. The pedal is constructed such that a rear end of a pedal bracket, that supports the control pedal such that the control pedal is capable of pivoting, is connected to a vehicle compartment side of a dash panel that separates an engine room and a vehicle compartment from each other. A rear end of the pedal bracket is mounted on a cowl top panel disposed at the upper side of the dash panel via a releasing mechanism. When the dash panel is moved toward the inner side of the vehicle compartment due to impact load, the rear end of the pedal bracket is released from the cowl top panel by the releasing mechanism to inhibit rearward movement of the control pedal. Such a mechanism, however, has a problem in that the moving direction of the rear end of the pedal bracket released from the cowl top is irregular.

To address this problem, there has been proposed a releasing mechanism that has a guide member provided in a vehicle body component member disposed at an inner position in a vehicle compartment than a pedal bracket and that guides the pedal bracket, after having been released from a cowl top panel, to a lower position when a dash panel is moved (rearward) to the inner side of the vehicle compartment due to an impact load applied to the vehicle.

However, since the above mechanism is constructed to release a rear end of the pedal bracket from the cowl top panel when the pedal bracket is move toward the rear of the vehicle due to a relative displacement of the dash panel with respect to the cowl top panel, the releasing mechanism may not function in the case where the cowl top panel and the dash panel are moved toward the rear of the vehicle at the same time, i.e. in the case where the cowl top panel and the dash panel are displaced relative to each other by only a small amount.

SUMMARY OF THE INVENTION

It is therefore an object of the present invention to provide a rearward displacement prevention mechanism for a control pedal, which is capable of surely releasing a pedal bracket by operation of a releasing mechanism even in the case where a cowl top panel and a dash panel are moved rearward at the same time.

To attain the above object, the present invention provides a rearward movement prevention mechanism for a control pedal, comprising: a dash panel that separates an engine room and a vehicle compartment from each other in a vehicle; a cowl top section disposed at an upper side of the dash panel; a pedal bracket having a front end thereof connected to a vehicle compartment side of the dash panel, and supporting the control pedal such that the control pedal is capable of pivoting; a releasing mechanism that is provided between the cowl top section and the rear end of the pedal bracket and is capable of releasing the rear end of the pedal bracket from the cowl top section; and a regulating device that is provided inside a vehicle compartment and is opposed to the cowl top section.

BRIEF DESCRIPTION OF THE DRAWINGS

The name of the invention, as well as other objects and advantages thereof, will be explained in the following with reference to the accompanying drawings, in which like reference characters designate the same or similar parts throughout the figures and wherein.

DETAILED DESCRIPTION OF THE PRESENTLY PREFERRED EMBODIMENT

Figure 1:
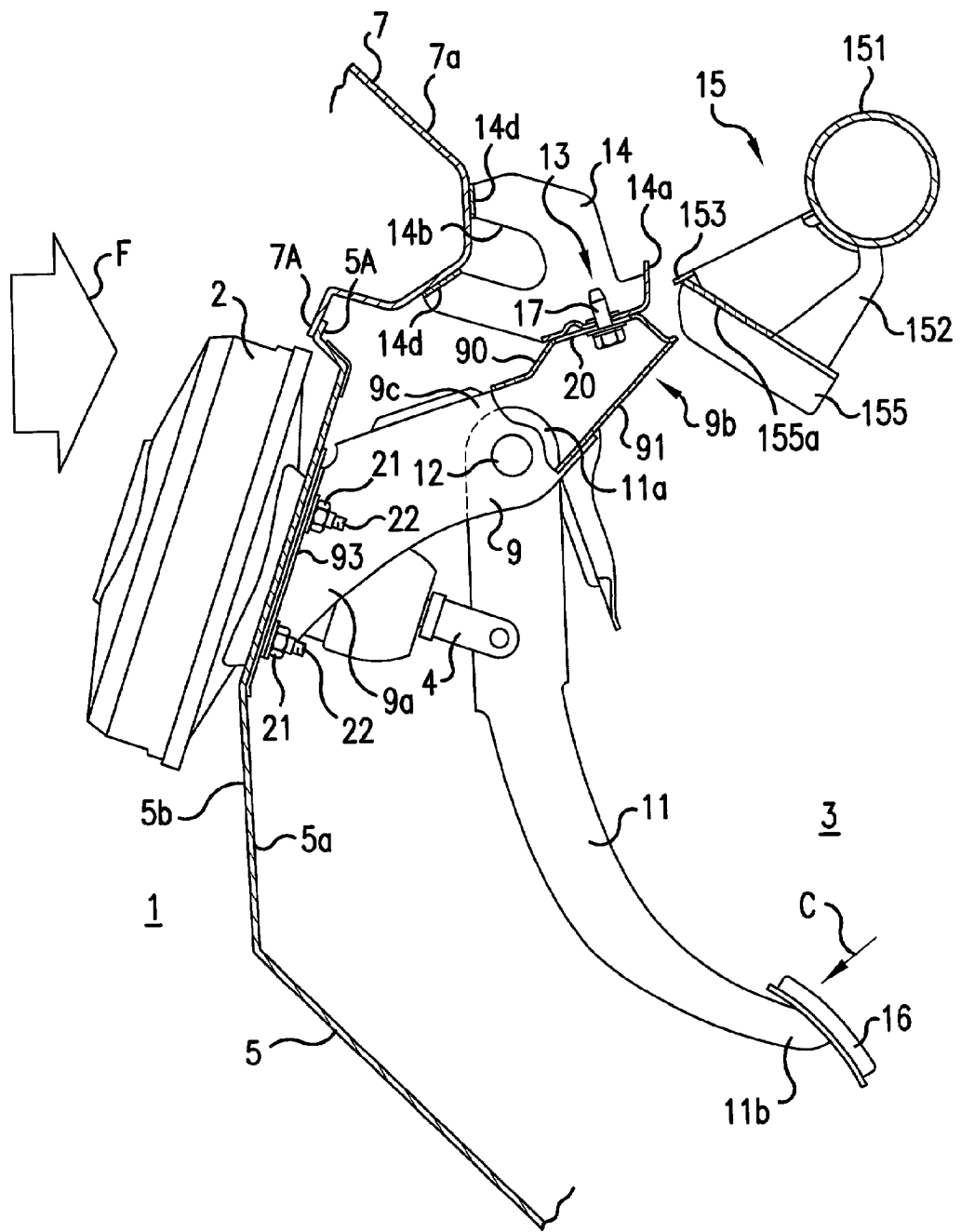
FIG. 1 is a general view showing a rearward displacement mechanism for a vehicle control pedal according to a first embodiment of the present invention.

A first embodiment of the present invention will now be described in detail with reference to the accompanying drawings. A rearward displacement prevention mechanism in FIG. 1 is applied to a brake pedal 11 as a suspended control pedal. The rearward displacement prevention mechanism is comprised of a metal dash panel 5 that separates an engine room 1 and a vehicle compartment 3 from each other in a vehicle, a metal cowl top panel (cowl top section) 7 disposed at the upper side of the dash panel 5, a mounting bracket (cowl top section) 14 that is joined to a vehicle compartment side of the cowl top panel 7, a metal pedal bracket 9 that supports the brake pedal 11 allows the brake pedal 11 to freely pivot, and a regulating device 15 that is provided inside the vehicle compartment 3 such that it is opposed to the mounting bracket 14.

The dash panel 5 extending in the direction of the vehicle width has an upper edge 5A thereof welded to a lower edge 7A of the cowl top panel 7 and has a lower edge thereof, not shown, welded to a component member such as a floor panel, not shown, of a vehicle body. A brake booster 2 is disposed in the engine room 1. The brake booster 2 is provided with a plurality of mounting bolts 22 that are designed to project into the vehicle compartment 3 through the dash panel 5 when the brake booster 2 is brought into contact with the dash panel 5.

The bolts 22 fasten a flange portion 93 that is formed at a front end 9a of the pedal bracket 9. By engaging nuts 21 with the bolts 22 from the inside of the vehicle compartment 3, the brake booster 2 is mounted on a surface 5b at the engine room side of the dash panel 5 and the pedal bracket 9 is mounted on a surface 5a at the vehicle compartment side of the dash panel 5.

The pedal bracket 9 is constructed to have a U-shaped cross-section from the front end 9a to a central part 9c thereof, and is mounted on the dash panel 5 such that an opening of the U-shaped cross-section faces downward. The pedal bracket 9 is also constructed to have a bag-shaped cross-section at a rear end 9b where an upper panel 90 and a lower panel 91 are joined together. A base end 11a of the brake pedal 11 is supported on side walls of the pedal bracket 9, which are opposed to each other in the direction of the vehicle width, such that the brake pedal 11 is capable of freely pivoting about a pin 12. An operating rod 4 of the brake booster 2 is connected to the base end 11a of the brake pedal 11 by the pin 12. By moving a pedaling section 16 provided at a pivoting end 11b of the brake pedal 11 in a pedaling direction indicated by an arrow C, the brake pedal 11 pivots about the pin 12 to operate the operating rod 4.

The mounting bracket 14 is formed of a plate having a U-shaped cross-section, and has a base end 14b thereof joined to a surface 7a at the vehicle compartment side of the cowl top panel 7. The mounting bracket 14 is formed with a wall-shaped contact surface 14a that is opposed to the regulating device 15. The mounting bracket 14 is formed with a cavity 14b from the center to the based end 14b thereof, so that the mounting bracket 14 can easily be collapsed.

Figure 2:
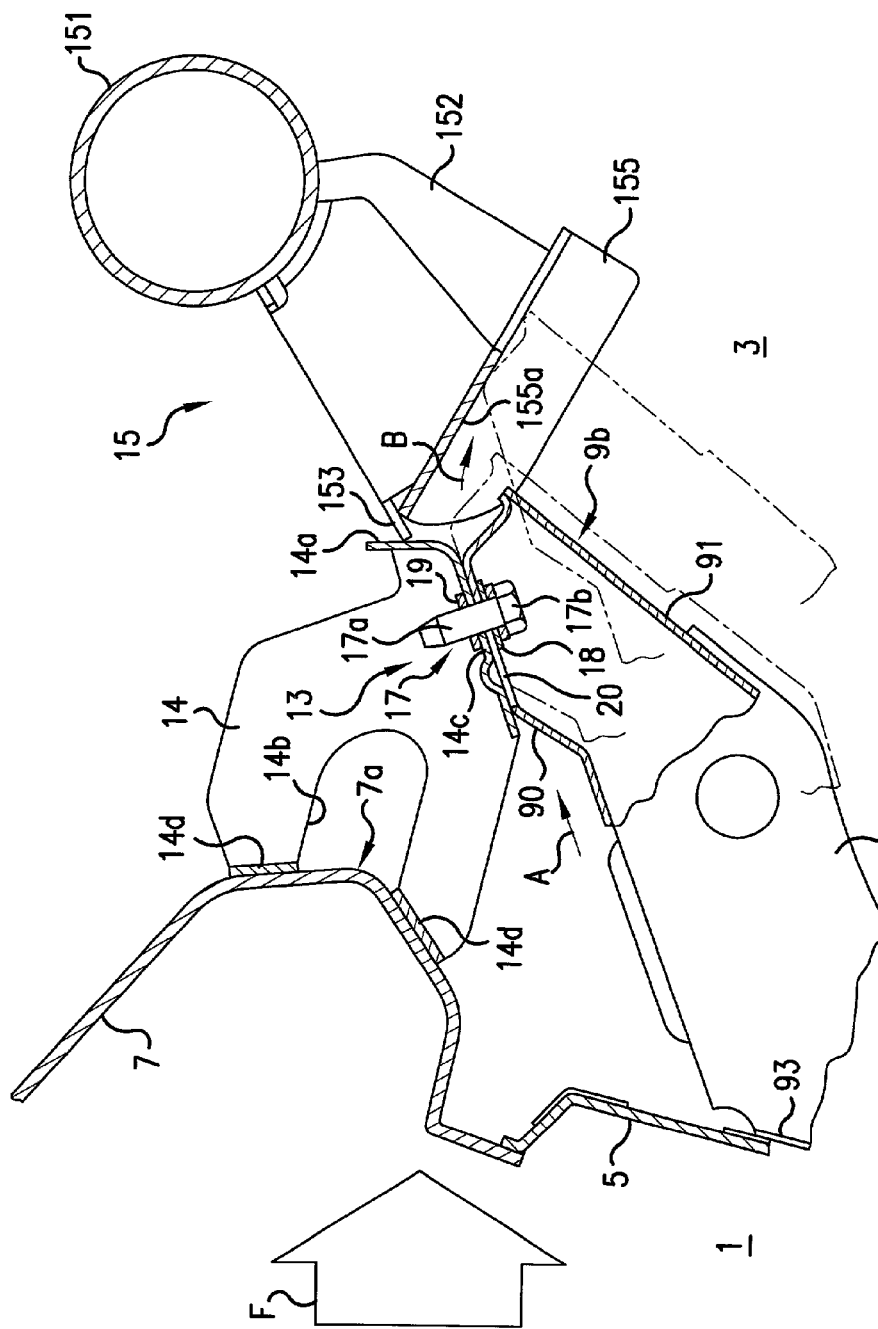
FIG. 2 is an enlarged view showing the state in which a dash panel and a cowl top are moved toward the inner side of a vehicle compartment by impact load.
Figure 3:
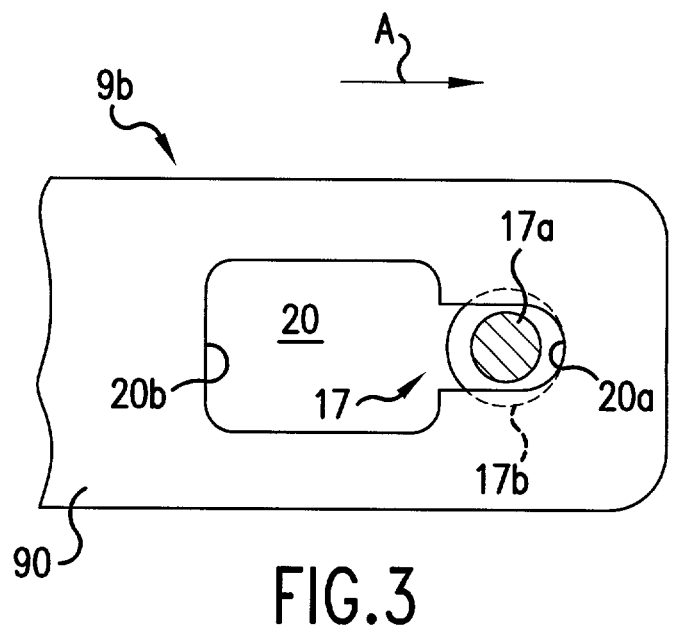
FIG. 3 is a schematic side view showing the position of a pedal bracket before its displacement.
Figure 4:
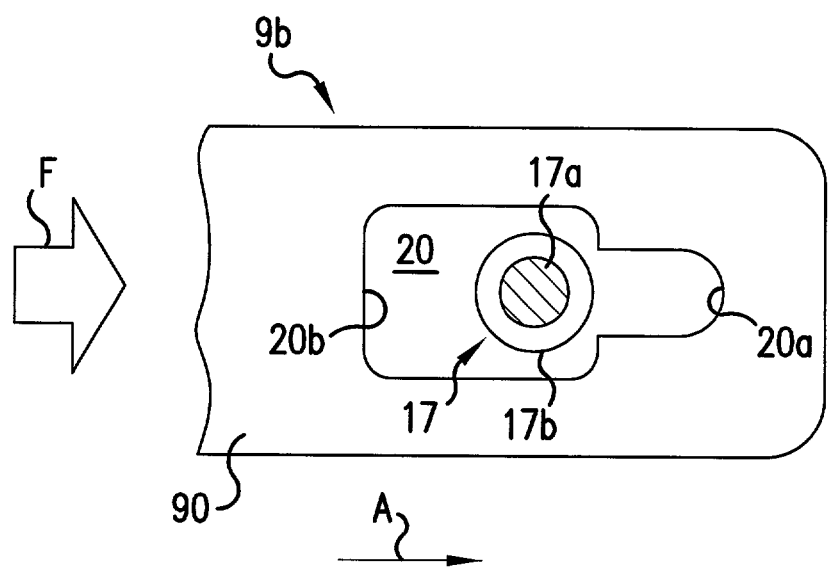
FIG. 4 is a schematic side view showing the position of the pedal bracket after its displacement.

The rear end 9b of the pedal bracket 9 is mounted on the mounting bracket 14 via a releasing mechanism 13. As shown in FIG. 2, the releasing mechanism is comprised of a release opening 20 formed in the upper panel 90, and a pin 17. The pin 17 is comprised of a shaft portion 17a and a pin head 17b that has a larger diameter than the shaft portion 17a. As shown in FIGS. 3 and 4, the release opening 20 extends in a direction in which the pedal bracket 9 moves as indicated by an arrow A. The opening 20 has an end 20a thereof positioned at the side of the regulating device 15 and is slightly larger than the shaft portion 17a, and an end 20b thereof having a size large enough for the pin head 17b to pass through. The pin 17 goes through a mounting portion 14c of the mounting bracket 14 opposed to the upper panel 90 and the end 20a of the release opening 20. By mounting a shaft release member 19 such as an E ring on the pin 17 from the mounting bracket 14, the rear end 9b of the pedal bracket 9 is held on the mounting bracket 14 such that it is capable of being released from the mounting bracket 14. In FIG. 2, reference numeral 18 denotes a washer that is disposed between the floor panel 90 and the pin head 17b.

The regulating device 15 is comprised of a cylindrical deck cross member 151 as a vehicle body component member extending in the direction of the vehicle width (vertical direction in FIG. 2), and a regulating member 152 that is integrated with the deck cross member 151 by welding or the like. The reason why the regulating member 152 is integrated with the deck cross member 151 is that the deck cross member 151 has a high stiffness since both ends thereof, not shown, positioned in the direction of the vehicle width are welded to the cowl top panel 7 and a front pillar, not shown. In the present embodiment, the deck cross member 151 is disposed at a slightly upper position than the center of the mounting bracket 14 such that it is opposed to the cowl top panel 7 and the mounting bracket 14.

The regulating member 152 is formed with a regulating section 153 that is capable of being brought into contact with a contact surface 14a of the mounting bracket 14 moving toward the inner side of the vehicle compartment 3 due to an impact load F applied from the front of the vehicle, and a guiding section 155 that guides the rear end 9b of the pedal bracket 9 released from the mounting bracket 14 toward a lower place in FIG. 2, which corresponds to the lower part of the vehicle. The impact load F is an impact force that is applied to the front of the vehicle when the front of the vehicle collides with something.

The regulating section 153 extends in the direction of the vehicle width, and a base end thereof has a U-shaped section. The regulating section 153 is disposed at such a position as to be brought into oblique contact with the contact surface 14a from above. Due to the integration with the deck cross member 151, the regulating section 153 has a higher stiffness than the mounting bracket 14. In order that the regulating section 153 is surely brought into contact with the contact surface 14a, the regulating section 153 is preferably disposed on the track of the mounting bracket 14, i.e. the track of the contact surface 14 when the impact load F is applied to the front of the vehicle.

The guiding section 155 has a U-shaped cross-section, and is comprised of a flat inclined guide surface 155a that is obliquely inclined downward to the right from a position close to the regulating section 153. Although in the present embodiment, the regulating section 153 and the guiding section 155 are formed in the regulating member 152 integrated with the deck cross member 151, the regulating section 153 and the guiding section 155 may be provided as separate component parts in the deck cross member 151 or similar vehicle body component member. Further, although in the present embodiment, the guiding section 155 has the flat inclined guide surface 155a, the guide surface 155a may be formed as an arc extending from the regulating member 153 toward the dash panel 5.

A description will now be given of the operation of the rearward displacement prevention mechanism that is constructed in the above-mentioned manner.

As shown in FIG. 2, when the dash panel 5 and the cowl top panel 7 are moved toward the inner side of the vehicle compartment 3 due to the impact load F applied to the front of the vehicle, the contact surface 14a of the mounting bracket 14 is brought into contact with the regulating section 153 of the regulating device 15, which is provided inside the vehicle compartment 3 opposing the cowl top panel 7. If a load applied to the mounting bracket 14 on this occasion is greater than the limit of the mounting bracket 14, the mounting bracket 14 is collapsed as a result of the contact with the regulating member 153, and if not, the mounting bracket 14 inhibits the cowl top panel 7 from moving toward the inner side of the vehicle compartment 3. Accordingly, the pin 17 of the releasing mechanism 13 is fixed, and thus, the pedal bracket 9 integrated with the dash panel 5 moves toward the inner side of the vehicle compartment 3 as indicated by an alternate long and short dash line in FIG. 2, 50 that the mounting bracket 14 and the dash panel 5 are displaced relatively to each other. When the pin head 17b is positioned at the end 20b of the release opening 20 as shown in FIG. 4 due to the movement of the pedal bracket 14, the rear end 9b of the pedal bracket 9 is surely released from the mounting bracket 14 since the force for holding the pedal bracket 9 is lost. The released rear end 9b moves toward the inner side of the vehicle compartment 3 while lowering as indicated by an arrow B in FIG. 2, and collides with the inclined guide surface 155a of the guiding section 155 as indicated by a two-dot chain line in FIG. 2. Therefore, the released rear end 9b is moved diagonally downward to the right in FIG. 4, and this prevents rearward displacement of the brake pedal 11.

Figure 5:
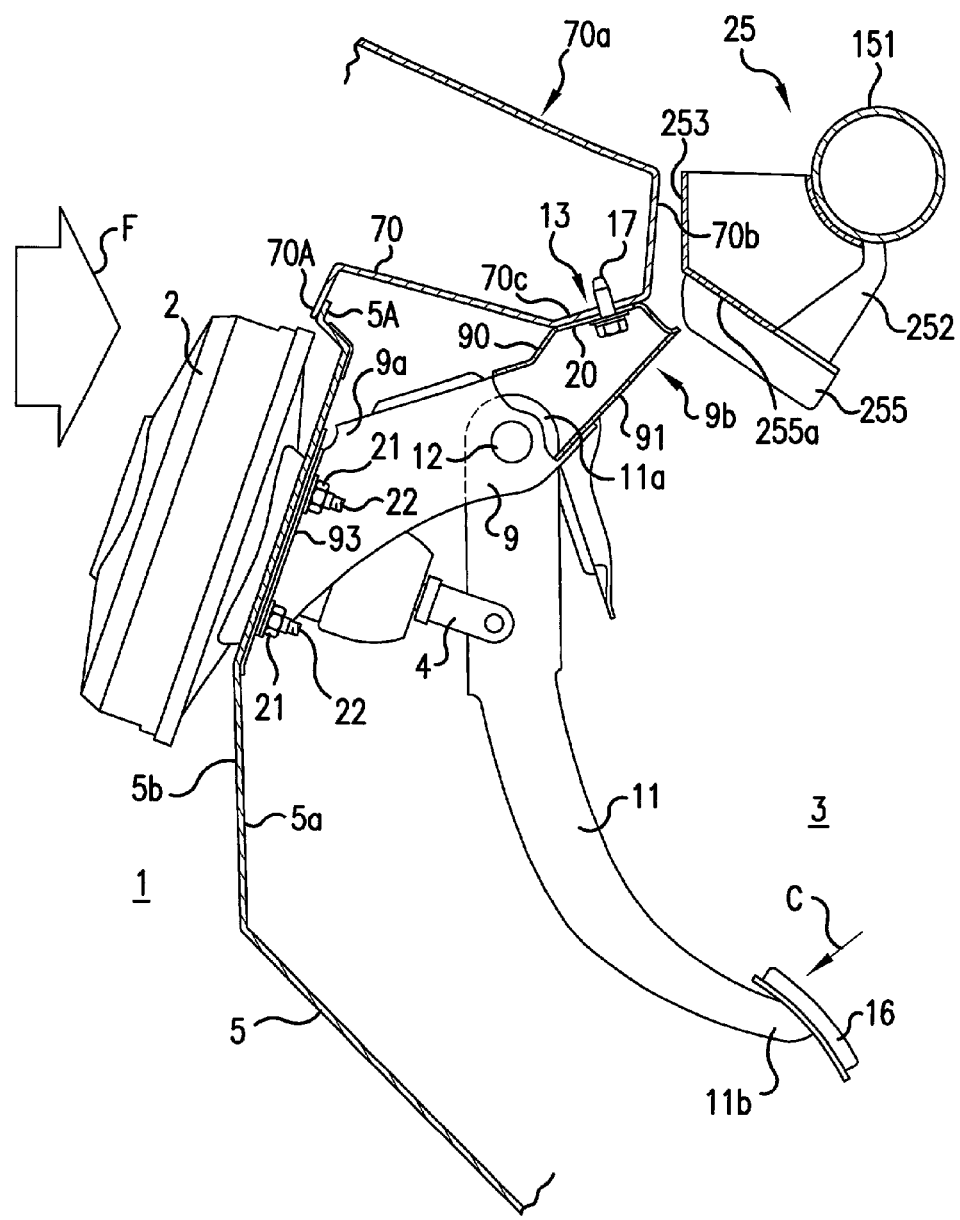
FIG. 5 is a general view showing a rearward displacement mechanism for a vehicle control pedal according to a second embodiment of the present invention.

FIG. 5 illustrates a rearward displacement prevention mechanism for a control pedal according to a second embodiment of the present invention. The second embodiment is characterized in that the rear end 9b of the pedal bracket 9 supporting the brake pedal 11, such that the pedal bracket 11 may freely pivot, is mounted at the vehicle compartment side of a cowl top panel 70 via the releasing mechanism 13, and a regulating device 25 is provided inside a vehicle compartment 3 opposing the cowl to panel 70. The second embodiment is different from the first embodiment shown in FIG. 1 in the shapes of the cowl top panel 70 and the regulating device 25 and in that the mounting bracket 14 is not provided. In the flowing description of the second embodiment, parts and elements corresponding to those of the first embodiment are denoted by the same reference numerals, and a description thereof is omitted herein. In the following description of the second embodiment, the construction of the cowl top panel 70 and the regulating device 25 will be mainly explained.

The cowl top panel 70 extends in the direction of the vehicle width, and has a lower end 70A thereof welded to the upper edge 5A of a dash panel 5 on which are commonly fastened a brake booster 2 and the front end 9a of the pedal bracket 9, so that the cowl top panel 70 is integrated with the dash panel 5. The cowl top panel 70 is formed with an expanding portion 70a that projects into the vehicle compartment 3.

The rear end 9b of the pedal bracket 9 is mounted on a mounting portion 70c of the expanding portion 70a opposed to the upper panel 90 via the releasing mechanism 13. In the present embodiment, the release opening 20 constituting the releasing mechanism 13 is formed in the mounting portion 70c, and the pin 17 is mounted on the shaft release member 19 from the expanding section 70a through the mounting portion 70c and the end 20a of the release opening 20. The releasing mechanism 13 holds the rear end 9b of the pedal bracket 9 on the cowl top panel 70 such that the rear end 9b is capable of being released from the cowl top panel 70.

The regulating device 25 is comprised of the deck cross member 151 disposed at an inner position in the vehicle compartment 3 than an end face 70b of the expanding portion 70a, and a regulating member 252 that is integrated with the deck cross member 151 by welding or the like. The reason why the regulating member 252 is integrated with the deck cross member 151 is that the deck cross member 151 has a high stiffness since both ends thereof, not shown, positioned in the direction of the vehicle width are welded to the cowl top panel 70 and a front pillar, not shown. In the present embodiment, the deck cross member 151 is opposed to the expanding portion 70a.

The regulating member 252 is formed with a regulating section 253 that is capable of being brought into contact with the end face 70b of the expanding portion 70a moving toward the inner side of the vehicle compartment 3 due to an impact load F applied to the front of the vehicle, and a guiding section 255 that guides the rear end 9b of the pedal bracket 9 released from the expanding portion 70a to a lower position in FIG. 5, which corresponds to the lower part of the vehicle.

The regulating section 253 is one surface of a U-shaped cross-section extending in the direction of the vehicle width, and is disposed at such a position as to be brought into frontal contact with the end face 70b. Due to the integration with the deck cross member 151, the regulating section 253 has a higher stiffness than the expanding portion 70a. In order that the regulating section 253 is surely brought into contact with the end face 70b, the regulating section 253 is preferably disposed on the track of the expanding portion 70a, i.e. the track of the expanding portion 70a when the impact force F is applied to the front of the vehicle.

The guiding section 255 has a U-shaped cross-section, and is comprised of a flat inclined guide surface 255a that is inclined obliquely downward to the right from a position close to the regulating section 253 in FIG. 5. Although in the present embodiment, the regulating section 253 and the guiding section 255 are formed in the regulating member 252 integrated with the deck cross member 151, the regulating section 253 and the guiding section 255 may be provided as separate component parts in the deck cross member 151 or similar vehicle body component part. Further, although in the present embodiment, the guiding section 255 has the flat inclined guide surface 255a, the guide surface 255a can be formed as an arc extending from the regulating member 253 toward the dash panel 5.

A description will now be given of the operation of the rearward displacement prevention mechanism that is constructed in the above-mentioned manner.

Figure 6:
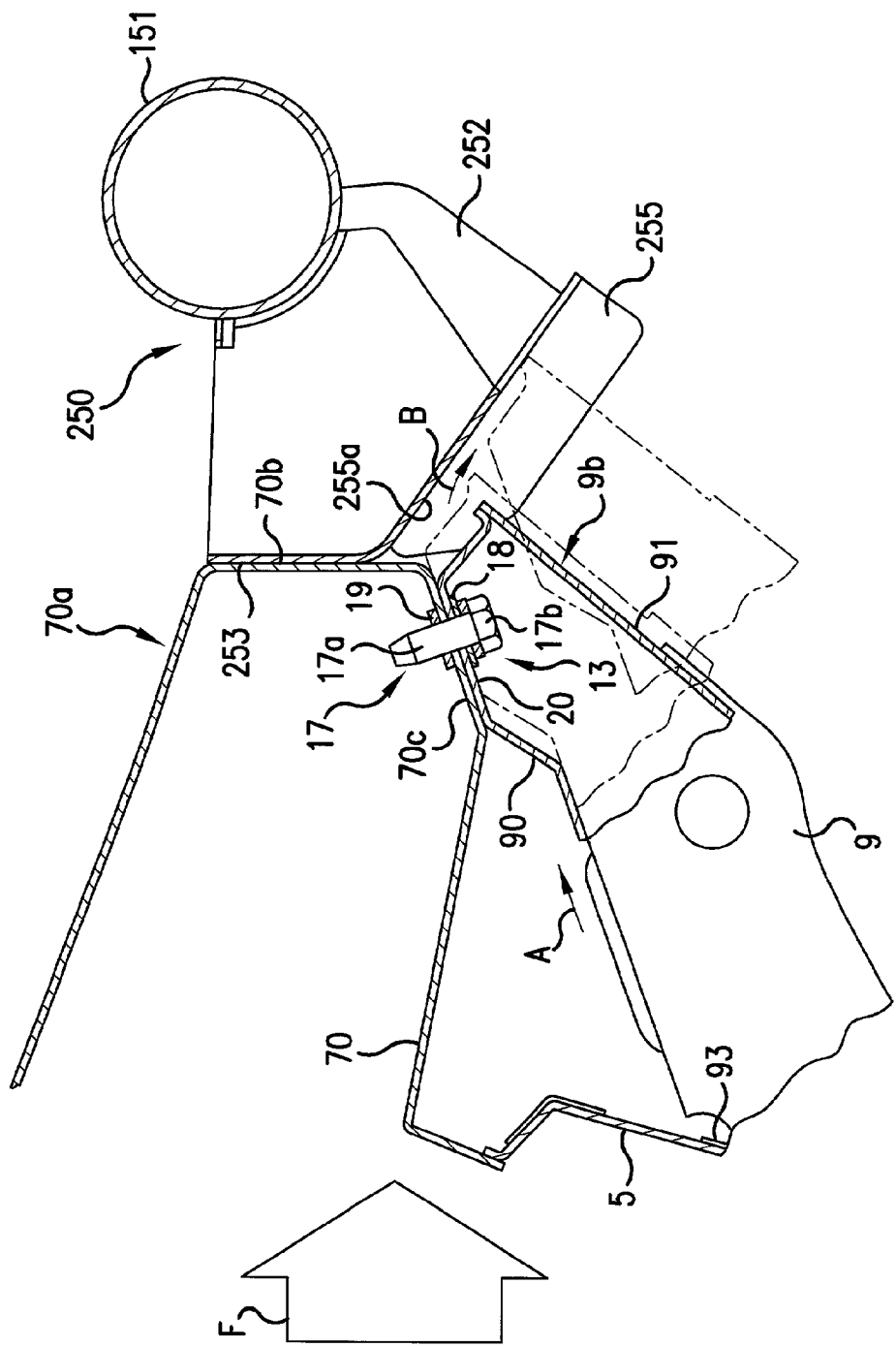
FIG. 6 is an enlarged view showing the state in which a dash panel and a cowl top are moved toward the inner side of a vehicle compartment by impact load according to the second embodiment.

As shown in FIG. 6, when the dash panel 5 and the cowl top panel 70 are moved toward the inner side of the vehicle compartment 3 due to the impact load F applied to the front of the vehicle, the end face 70b of the cowl top panel 70 is brought into contact with the regulating section 253 of the regulating device 25, which is provided inside the vehicle compartment 3 to be opposed to the expanding portion 70a of the cowl top panel 70. If a load applied to the end face 70b on this occasion is greater than the limit of the expanding portion 70a, the expanding portion 70a is collapsed as a result of the contact with the regulating member 253, and if not, the expanding portion 70a inhibits the cowl top panel 70 from moving toward the inner side of the vehicle compartment 3. Accordingly, the pin 17 of the releasing mechanism 13 is fixed, and thus, the pedal bracket 9 integrated with the dash panel 5 moves toward the inner side of the vehicle compartment 3 as indicated by an alternate long and short dash line in FIG. 6, so that the expanding portion 70a and the dash panel 5 are displaced relatively to each other. When the pin head 17b is positioned at the end 20b of the release opening 20 as shown in FIG. 4 due to the movement of the pedal bracket 9, the rear end 9b of the pedal bracket 9 is surely released from the expanding portion 70a since the force for holding the pedal bracket 9 is lost. The released rear end 9b moves toward the inner side of the vehicle compartment 3 while lowering as indicated by an arrow B in FIG. 6, and collides with the inclined guide surface 255a of the guiding section 255 as indicated by a two-dot chain line in FIG. 6. Therefore, the released rear end 9b is moved obliquely downward to the right in FIG. 4, and this prevents rearward displacement of the brake pedal 11.

The releasing mechanism in the above-described embodiments utilizes the relative displacement of the dash panel 5 and the cowl top panel 7, and therefore, even if only the dash panel 5 moves toward the inner side of the vehicle compartment 3 due to the impact load F, the pin 17 is fixed on the mounting bracket 14 or the mounting portion 70c of the expanding portion 70a. Thus, at a time point when the pin head 17b is positioned at the end 20b of the release opening 20 as a result of the movement of the pedal bracket 9, the rear end 9b of the pedal bracket 9 can be surely released from the mounting bracket 14 or the expanding portion 70a.

Although in the above-described the embodiments, the brake pedal 11 is used as a control pedal, it goes without saying that the present invention may be applied to a rearward displacement prevention mechanism that prevents a clutch pedal that engages and disengages a clutch in the case where a transmission installed in a vehicle is a manual transmission. Further, although in the above-described embodiments, the operating rod 4 of the brake booster 2 is directly connected to the brake pedal 11, a brake pedal for use in side braking may be used as the brake pedal 11.

The invention claimed is:

1. A rearward movement prevention mechanism for a control pedal, comprising:
 a dash panel that separates an engine room and a vehicle compartment from each other in a vehicle;
 a cowl top section disposed at an upper side of said dash panel;
 a pedal bracket having a front end thereof connected to a vehicle compartment side of said dash panel, and supporting the control pedal, such that the pedal bracket pivotally supports the control pedal;
 a releasing mechanism provided between said cowl top section and the rear end of said pedal bracket and being capable of releasing the rear end of said pedal bracket from said cowl top section; and
 a regulating device provided rearward of and opposing said cowl top section, and adapted to make contact with said pedal bracket only after a vehicle collision,
 wherein said cowl top section is a cowl top panel, and said releasing mechanism is responsive to contact of said cowl top panel with said regulating device, for releasing the rear end of said pedal bracket from said cowl top panel.

2. A rearward movement prevention mechanism for a control pedal, comprising:
 a dash panel that separates an engine room and a vehicle compartment from each other in a vehicle;
 a cowl top section disposed at an upper side of said dash panel;
 a pedal bracket having a front end thereof connected to a vehicle compartment side of said dash panel, and supporting the control pedal, such that the pedal bracket pivotally supports the control pedal;
 a releasing mechanism provided between said cowl top section and the rear end of said pedal bracket and being capable of releasing the rear end of said pedal bracket from said cowl top section; and
 a regulating device provided rearward of and opposing said cowl top section, and adapted to make contact with said pedal bracket only after a vehicle collision,
 wherein said cowl top section includes a cowl top panel and a mounting bracket provided at a vehicle compartment side of said cowl top panel, and said releasing mechanism is responsive to contact of said mounting bracket with said regulating device, for releasing the rear end of said pedal bracket from said mounting bracket.

3. A rearward movement prevention mechanism for a control pedal according to claim 2, wherein
 a cavity is formed in said mounting bracket.

* * * * *